United States Patent

Burns et al.

[11] Patent Number: 5,995,518
[45] Date of Patent: Nov. 30, 1999

[54] SYSTEM AND METHOD FOR COMMUNICATION OF INFORMATION USING CHANNELS OF DIFFERENT LATENCY

[75] Inventors: Ronnie R. Burns, Irvine; Donald C. Mead, Carlsbad; Lawrence P. Seidman, Irvine, all of Calif.

[73] Assignee: Hughes Electronics Corporation

[21] Appl. No.: 08/850,022

[22] Filed: May 1, 1997

[51] Int. Cl.⁶ ....................................................... H04J 3/06
[52] U.S. Cl. ............................................ 370/503; 370/252
[58] Field of Search ..................................... 370/503, 350, 370/389, 392, 395, 396, 397, 398, 399, 400, 351, 352, 353, 535, 356, 537, 516, 519, 468; 348/395, 403, 384, 390, 400, 405, 407, 409, 413, 415, 416, 402, 406, 408; 382/190, 232, 236, 238, 243, 248, 250, 276; 358/133, 135, 260, 287

[56] References Cited

U.S. PATENT DOCUMENTS 5,856,975  1/1999  Rostoker et al. ........................ 370/466

*Primary Examiner*—Dang Ton
*Attorney, Agent, or Firm*—Terje Gudmestad; Georgann Grunebach; Michael W. Sales

[57] ABSTRACT

A system and method for communication of information using channels of different latency combine a high latency communication channel with a low latency communication channel to reduce the communication delay perceived by a user. The system and method includes separating information into first and second components based on a parameter correlated to the perceived delay, communicating the first component via a first channel, communicating the second component via a second channel having a communication delay greater than the first channel, and generating a representation of the information based on the first component. The second component of the information may be used to augment or modify the information represented by the first component. In one embodiment, the invention is applied to video teleconferencing where voice information and basis image information is transmitted via the low latency channel while background and other non-real-time information is communicated via the high latency communication channel.

15 Claims, 2 Drawing Sheets

SYSTEM AND METHOD FOR COMMUNICATION OF INFORMATION USING CHANNELS OF DIFFERENT LATENCY

CROSS-REFERENCE TO RELATED APPLICATION

The present invention is related to U.S. application Ser. No. 08/761,413, filed on Dec. 6, 1996 titled "Methods and Systems for Super Compression of Prior Known Objects in Video and Film," now Pat. No. 5,940,129 the disclosure of which is hereby incorporated by reference in its entirety.

TECHNICAL FIELD

The present invention relates to a method for providing high quality low latency interactive communication of wideband information such as that communicated in video teleconferencing applications.

BACKGROUND ART

An ideal communication system would be capable of instantly transmitting a seemingly unlimited amount of information over a particular communication channel covering any distance within a period of time imperceptible to the user of the information, whether human or machine. Of course, communication of information in any real system is subject to a number of often complementary or related constraints. Optimization of a communication system for any particular application involves compromises of conflicting constraints which likely include economic considerations.

Communication channels and associated communication protocols may be described by any of a number of parameters or operating characteristics which ultimately affect the quality and quantity of information which may be communicated. The rate or throughput of information transferred, or the criticality or importance of the information, may control the design or selection of a particular communication system or communication media. In general, higher quality and higher rate communication channels are more expensive to utilize because of the increased portion of the total available bandwidth which must be allocated to a fewer number of individual applications. Thus, economic considerations impose use of the lowest rate and lowest quality communication system or channel which is acceptable for a particular application.

The selected communication channel or protocol may impose significant delays between generation of information at one location and receipt of information at another location. Such delays make various types of communication media and channels unacceptable for interactive applications such as remote computing and video teleconferencing which impose constraints of real-time or near real-time responsiveness to be considered high quality.

SUMMARY OF THE INVENTION

It is an object of the present invention to provide a communication system and method for interactive communication applications which reduce perceived delay between transmission and reception of information.

Another object of the present invention is to provide a method and system for interactive communication which use two communication channels having different communication latencies to reduce the communication latency perceived by a user.

A further object of the present invention is to provide a system and method for communication which use communication channels having different transmission rates in combination to reduce the delay perceived by a user.

Yet another object of the present invention is to provide a system and method for use in video teleconferencing which use a low latency, low bandwidth communication channel in combination with a high latency, high bandwidth communication channel.

In carrying out the above objects and other objects of the present invention, a method is provided for reducing perceived delay between transmission and reception of information, the method includes separating the information into first and second components based on at least one predetermined parameter correlated to the perceived delay, communicating the first component via a first channel characterized by a first bandwidth and a first communication delay, communicating the second component via a second channel characterized by a second bandwidth and a second communication delay, the second communication delay being greater than the first communication delay, and generating a representation of the information based on the first component to reduce the perceived delay.

A system is also provided for wideband communication of information while reducing perceived latency between transmission and reception. The system includes a first transmitter having an associated first communication channel characterized by a first communication latency and a second transmitter having an associated second communication channel characterized by an associated second communication latency, the second communication latency being greater than the first communication latency. The system also includes a first encoder for generating a symbolic representation of the information, a second encoder in communication with the first encoder for generating a bit stream representing the symbolic representation generated by the first encoder and control information, and a router in communication with the second encoder and the first and second transmitters for directing a first portion of the bit stream to the first transmitter and a second portion of the bit stream to the second transmitter based on the control information. The first transmitter transmits the first portion of the bit stream and the second transmitter transmits the second portion of the bit stream to provide wideband communication of the information while reducing the perceived latency.

In the preferred embodiment, the system and method of the present invention are utilized to provide interactive communication for various types of applications such as video teleconferencing and remote computing.

The advantages accruing to the present invention are numerous. For example, the present invention reduces the perceived latency in communication to improve quality of communication by using a low latency, low bandwidth channel to augment a wideband channel which may have a greater latency. The present invention allows use of a geosynchronous satellite for a wideband communication channel in combination with a satellite in low earth orbit as a low latency, low bandwidth communication channel to provide high quality interactive communication such as desired in video teleconferencing.

The above object and other objects, features, and advantages of the present invention will be readily appreciated by one of ordinary skill in the art from the following detailed description of the best mode for carrying out the invention when taken in connection with the accompanying drawings.

BEST MODE(S) FOR CARRYING OUT THE INVENTION

Figure 1:
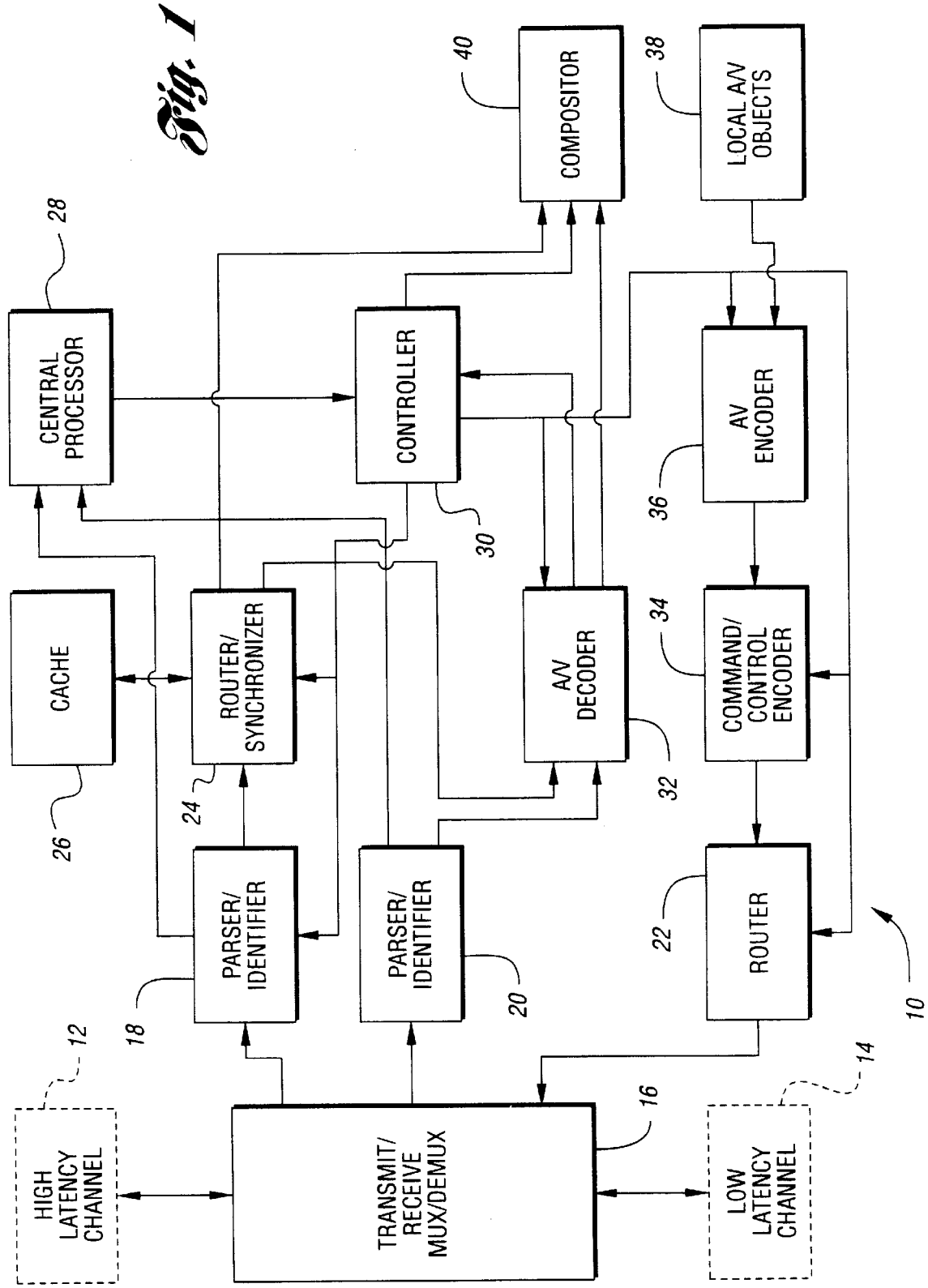
FIG. 1 is a block diagram illustrating reduction of latency perceived by a user using two communication channels having different latencies according to the present invention.

Referring now to FIG. 1, a block diagram illustrating a system for reducing perceived latency in communication according to the present invention is shown. As will be appreciated by one of ordinary skill in the art, the functions depicted in the block diagram of FIG. 1 may be implemented in software, hardware or any combination of the two depending upon the particular application. Similarly, each functional block may be implemented by discrete software modules or hardware components, or various blocks may be integrated depending upon the particular application without departing from the spirit or scope of the invention.

The system, indicated generally by reference numeral 10, is in communication with a high latency communication channel as represented by block 12, in addition to a low latency communication channel as represented by block 14. The high latency communication channel may be a "receive only" (half-duplex) or full duplex depending upon the particular application. As used herein, high latency and low latency are relative designations intended to be application-specific. As such, a high latency channel is one which, if used exclusively for a particular application, would result in unacceptable performance as measured by the intended users of the system. Similarly, a low latency channel would be one in which the communication device is acceptable for the application as judged by the intended user or users. Generally, high latency communication channel 12 will also support a higher communication rate or bandwidth compared to low latency communication channel 14 which may be half duplex, but is preferably full duplex for transmission and reception of information. Low latency communication channel 14 is generally characterized by a lower communication rate than channel 12.

One example of a high latency communication channel having a large bandwidth (or high communication rate) is a typical transponder channel on a satellite in geosynchronous orbit. Because of the distance from Earth, the channel intrinsically has a relatively high latency which may be on the order of about a second. Low latency communication channel 14 may represent a channel on a satellite in low-Earth orbit. Any of a number of other communication channels may be utilized to provide the relative high and low latency communication channels according to the present invention.

Block 16 of FIG. 1 represents the transmitter and receiver module which also includes the system multiplexer and demultiplexer. Block 16 communicates with a first parser/identifier 18, generally associated with the high latency channel, and a second parser/identifier 20, generally associated with the low latency communication channel. As illustrated, block 16 also receives data and control signals from router 22 for transmission over high latency communication channel 12 or low latency communication channel 14. Parser/identifier 18 sends signals to router/synchronizer 24 and central processor 28 while receiving signals from controller 30. Second parser/identifier 20 is in communication with central processor 28 and audio/visual (A/V) decoder 32. Router/synchronizer 24 is in communication with cache 26 to exchange data representing both coded and decoded objects. Cache 26 may be any storage device such as a disk, or memory device. While cache 26 could be a read-only device, it is preferably a readable and writable device, as described in greater detail below.

Router/synchronizer 24 is also in communication with A/V decoder 32 and controller 30. Central processor 28 receives signals from parser/identifier 18 and second parser/identifier 20 while sending signals to controller 30. Central processor 28 also controls temporal alignment or timing of transmitted and received information frames such that a received sequence of information may be properly reconstructed. Preferably, central processor 28 utilizes a time stamp, such as the time stamp provided in the MPEG compression standard, to temporally align information frames. Controller 30 is a real-time controller which is driven by central processor 28. Controller 30 also communicates with a compositor 40 in addition to A/V decoder 32, A/V encoder 6, command/control encoder 34, and router 22. Compositor 40 is also in communication with A/V decoder 32. Block 38 represents vocal audio/visual objects and is in communication with A/V encoder 36.

In operation, a signal is received from high latency communication channel 12 and low latency communication channel 14 by receiver 16 which demultiplexes the signal and directs it to the appropriate parser/identifier 18,20. Each parser/identifier parses the bitstream to identify encoded objects, commands, and control signals. In general, low latency communication channel 14 is used to transmit command and control information as well as software objects in addition to A/V objects which are passed to central processor 28. Audio visual objects may also be parsed by parser/identifier 20 and communicated to A/V decoder 32. Status information is passed from decoder 32 to controller 30. Data representing A/V objects is passed from decoder 32 to compositor 40 for generating a representation of the information. The representation may be a visual rendering of the objects which is preferably based on the information communicated over low latency communication channel 14. Compositor 40 receives cached objects which have been decoded from router/synchronizer 24. Real-time controller 30 provides signals to control display of the information to compositor 40 in the proper time sequence based on signals received from central processor 28.

Information which is communicated over high latency channel 12 and separated from information which is communicated over low latency channel 14 by the multiplexer 16 is passed to parser/identifier 18. The bitstream is separated by parser/identifier 18 to provide appropriate signals to router/synchronizer 24 and identify previously stored objects to central processor 28. Router/synchronizer 24 communicates with cache 26 to retrieve previously cached objects or to store objects for future use. Once block 18 identifies an object which has been previously stored, this is communicated to central processor 28 which, in turn, passes a signal to real-time controller 30 to coordinate the retrieval of the stored object from cache 26 via synchronizer 24 and display of the retrieved object by compositor 40. Central processor 28 executes software application programs or scripts and can identify all available objects which have been previously stored in cache 26 along with their associated timing values where needed.

With continuing reference to FIG. 1, local A/V objects 38 represent those objects which are specific to a particular user or location as described in application Ser. No. 08/761,413, entitled "Methods and Systems for Supercompression of Prior Known Objects in Video and Film." Responses generated by central processor 28 are passed through controller 30 and then to A/V encoder 36, command/control encoder 34, and router 22. Router 22 determines whether the information is to be transmitted via high latency communication channel 12 or low latency communication channel 14 based on the control signal provided by controller 30. Block 16 then multiplexes and transmits the information via the appropriate channel.

Thus, in operation, system 10 caches objects transmitted via high latency information channel 12 until they are needed. Such objects may include software objects, textures used for rendering, new basis images, or personalization data including details which would modify a basis image such as an image of a head or a standard library voice. Alternatively, these objects may be routed directly to compositor 40 with or without time correction. This would allow loading of a complex scene which would then be manipulated by information received via low latency communication channel 14.

In one embodiment of the present invention, system 10 is applied to video teleconferencing using a geosynchronous satellite to provide high latency communication channel 12 and a satellite in low-Earth orbit to provide low latency communication channel 14. In this application, the communication delay or latency for the high latency channel 12 would be about 0.5 seconds in the best case. By storing a basis image representing the face of the speaker, including collateral information such as position of the speaker with respect to the camera and the like, low latency communication channel 14 may be used to transmit audio information in addition to encoded video information to reduce the perceived latency at the receiver. The encoded video information would identify the speaker, the angle, parameters for the facial muscles, and the like. Therefore, display of the speaker via compositor 40 can begin with very low communication delay. High latency communication channel 12 can be used to augment and enhance the information transmitted via low latency channel 14. This reduces the communication delay or latency as perceived by the user since movement of the speaker is nearly coincident with the actual speaker movements and voice.

Of course, the present invention may be applied to a number of applications other than video teleconferencing as described above. For a low resolution video teleconference, low latency communication channel 14 may be used to transmit information representing voice, a cursor or pointer, or positioning or manipulation of icons. High latency communication channel 12 is used to transmit information representing non-real-time background graphics. For remote computing applications such as multi-player games, low latency communication channel 14 would be used to transmit commands and responses and to communicate with other players, while high latency communication channel 12 would be used to download scenes including possible branch scenes and associated software. For other multimedia applications, low latency communication channel 14 would be used to transmit real-time data, such as requested text updates or object manipulations, in addition to voice discussion relative to a particular video sequence. High latency communication channel 12 would be used to transmit a "stage" (such as a window or graphics) in addition to audio or video which is delayed at the transmission source by the characteristic latency of the high latency communication channel 12.

For higher resolution video teleconferencing, high latency communication channel 12 would be used at the beginning of the conference, and periodically during the conference, to transmit selected basis images (such as head positions) to form a library of basis images or objects. Low latency communication channel 14 could be used to transmit information representing voice, codes to identify the basis images or objects, morphing/warping transforms, and residual error relative to the basis images or objects. As another example, the present invention may be used in VRML (virtual reality meta-language) and Java™ type applications where "wire frame" data is transmitted via low latency communication channel 14. High latency communication channel 12 is used to transmit information representing "texture map" data or other large files which may be preloaded and cached for use by the information transmitted via low latency communication channel 14.

Figure 2:
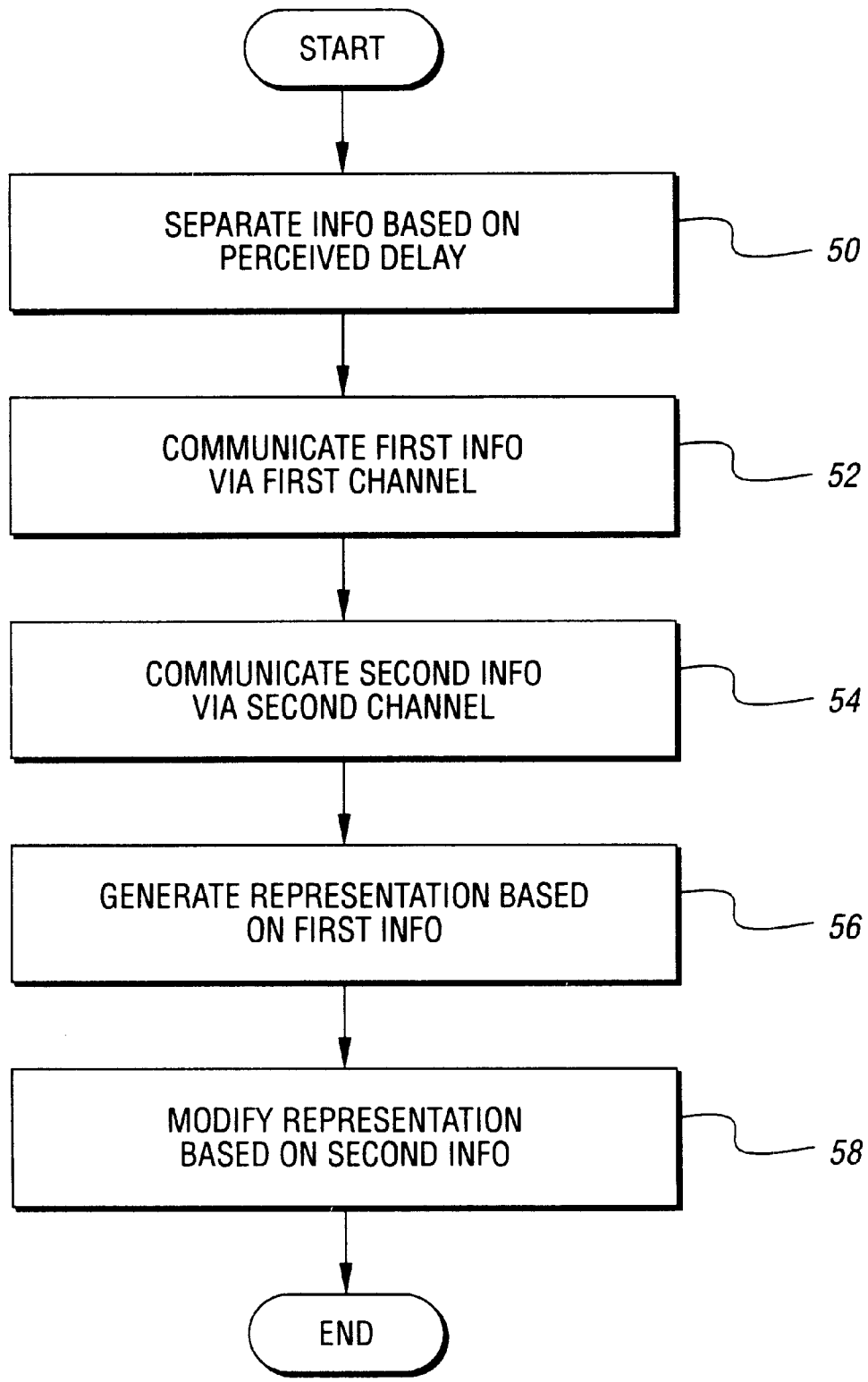
FIG. 2 is a flow diagram illustrating a method for reducing perceived latency of a high latency communication channel according to the present invention.

Referring now to FIG. 2, a flow diagram illustrating operation of a system and method for reducing perceived latency in communication according to the present invention is shown. FIG. 2 indicates sequential operation as a matter of convenience only. One of ordinary skill in the art will recognize those functions or steps which must necessarily occur prior to subsequent, dependent functions as opposed to those which may be performed or initiated simultaneously or nearly simultaneously depending upon the particular implementation.

Block 50 of FIG. 2 represents separation of the information into first and second components based on at least one predetermined parameter which is correlated to the perceived delay. This step may be performed manually by the system designer depending upon the particular application as indicated by the example above. In such an embodiment, the system would automatically separate the information based on a predetermined designation for transmission via the high latency communication channel or the low latency communication channel. Where the communication channels have different communication rates or bandwidths, the frequency content of the information may be used to determine which channel is utilized for communication.

Block 52 represents communicating the first component of the information via a first communication channel. As indicated above, the communication channels may be characterized by a bandwidth or transmission rate and a communication delay or latency. Block 54 represents communication of the second component of the information via a second communication channel. The second communication channel has a communication latency greater than the first communication channel.

A representation based on the first component of the information is generated as represented by block 56. Because the first component of the information is transmitted via a low latency communication channel, generation of a representation based on the first component reduces the delay perceived by the user. The second component of the information may then be used to modify or augment the representation generated by block 56 as represented by block 58.

In one embodiment, the information represents an image. The second component of the information represents a previously stored image whereas the first component represents a difference between the previously stored image and a current image in addition to an identifier for the previously stored image. The identifier and the difference between the previously stored image and the current image is transmitted via the low latency communication channel so that the representation may be generated in real-time or near real-time.

In an alternative embodiment, the information is generated by an application program, such as a game, executing on a remote computer. The game includes commands which are initiated by a player, responses which are initiated by the remote computer, and graphics representing various scenes of the game. In this embodiment, the first component is used to represent the commands and responses while the second component represents the graphics.

More generally, the information may be generated by any application program executing on a remote computer. In such an embodiment, the first component of the information is used to represent feedback in response to a command initiated by the user of the program. For example, the feedback may be change of position of a cursor in response to movement of an input device, such as a mouse, keyboard, or the like.

It is understood, of course, that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention as disclosed.

What is claimed is:

1. A method for reducing perceived delay between transmission and reception of information, the method comprising:
    separating the information into first and second components based on at least one predetermined parameter correlated to the perceived delay;
    communicating the first component via a first channel characterized by a first bandwidth and a first communication delay;
    communicating the second component via a second channel characterized by a second bandwidth and a second communication delay, the second communication delay being greater than the first communication delay; and
    generating a representation of the information based on the first component to reduce the perceived delay between transmission and reception of the information.

2. The method of claim 1 further comprising:
    modifying the representation of the information based on the second component.

3. The method of claim 1 further comprising:
    storing the second component after reception for use in generating future representations of similar information.

4. The method of claim 1 wherein the first component comprises a header transmitted to initialize a transaction.

5. The method of claim 1 wherein the step of separating comprises separating the information based on frequency.

6. The method of claim 1 wherein the information represents an image, the second component represents a previously stored image, and the first component represents a difference between the previously stored image and a current image.

7. The method of claim 1 wherein the information represents an image sequence and wherein the at least one parameter corresponds to rate of change of the information corresponding to a predetermined position within each image of the sequence.

8. The method of claim 6 wherein the second component represents a substantially stationary background image.

9. The method of claim 1 wherein the information is generated by a game executing on a remote computer, the game including commands initiated by a player, responses initiated by the remote computer, and graphics representing various scenes of the game, the first component representing the commands and the responses, and the second component representing the graphics.

10. The method of claim 1 wherein the information is generated by an application program executing on a remote computer and wherein the first component represents feedback in response to a command initiated by a user of the application program.

11. The method of claim 9 wherein the step of generating a representation of the information comprises changing position of a cursor in response to movement of an input device.

12. A system for providing wideband communication of information while reducing perceived latency between transmission and reception, the system comprising:
    a first transmitter having an associated first communication channel characterized by a first communication latency;
    a second transmitter having an associated second communication channel characterized by an associated second communication latency, the second communication latency being greater than the first communication latency;
    a first encoder for generating a symbolic representation of the information;
    a second encoder in communication with the first encoder for generating a bit stream representing the symbolic representation generated by the first encoder and control information; and
    a router in communication with the second encoder and the first and second transmitters for directing a first portion of the bit stream to the first transmitter and a second portion of the bit stream to the second transmitter based on the control information;
    wherein the first transmitter transmits the first portion of the bit stream and the second transmitter transmits the second portion of the bit stream to provide wideband communication of the information while reducing the perceived latency.

13. The system of claim 12 further comprising:
    a controller in communication with the first encoder, the second encoder, and the router for generating the control information.

14. The system of claim 13 further comprising:
    a first receiver associated with the first communication channel for receiving the first portion of the transmitted bit stream;
    a second receiver associated with the second communication channel for receiving the second portion of the transmitted bit stream;
    a first parser in communication with the first receiver and the controller for parsing the first portion of the bit stream to identify predetermined objects;
    a second parser in communication with the second receiver and the controller for parsing the second portion of the bit stream to identify predetermined objects and control information;
    a second router in communication with the first parser and the controller for routing portions of the bit stream based on the control information and the predetermined objects;
    a cache in communication with the second router for storing the predetermined objects and providing previously stored objects to the second router;
    a decoder in communication with the second router, the second parser, and the controller for decoding the symbolic representations; and
    a compositor in communication with the second router, the controller and the decoder, the compositor generating a scene representing the information using the first portion of the bit stream and modifying the scene based on the second portion of the bit stream.

15. A method for communicating audio and video information to reduce perceived latency between transmission and reception of the information and to reduce perceived latency between reception of the audio information and video information, the method comprising:

processing the audio and video information to generate a symbolic representation having audio and corresponding video based on deviations from predetermined, stored audio and video information, respectively;

transmitting the symbolic representation via a first communication channel having an associated first communication latency;

representing the audio and video information using the transmitted symbolic representation to reduce perceived latency between transmission and reception;

transmitting the audio and video information via a second communication channel having an associated second communication latency, the second communication latency being greater than the first communication latency; and using the audio and video information transmitted via the second communication channel to enhance the symbolic representation.

* * * * *